US008127736B2

United States Patent
Lee et al.

(10) Patent No.: US 8,127,736 B2
(45) Date of Patent: Mar. 6, 2012

(54) BALANCING ASSEMBLY OF AN ENGINE

(75) Inventors: Byung Chul Lee, Suwon (KR); Soo Hong Lee, Seoul (KR); Jeyong Yun, Icheon (KR)

(73) Assignee: Hyundai Motor Company, Seoul (KR)

( * ) Notice: Subject to any disclaimer, the term of this patent is extended or adjusted under 35 U.S.C. 154(b) by 676 days.

(21) Appl. No.: 12/274,171

(22) Filed: Nov. 19, 2008

(65) Prior Publication Data

US 2009/0277414 A1 Nov. 12, 2009

(30) Foreign Application Priority Data

May 9, 2008 (KR) .......................... 10-2008-0043606

(51) Int. Cl.
*F02B 75/06* (2006.01)

(52) U.S. Cl. ....................................... 123/192.2; 74/603
(58) Field of Classification Search ................ 123/192.2, 123/192.1; 74/603, 604
See application file for complete search history.

(56) References Cited

U.S. PATENT DOCUMENTS

| 1,803,317 | A | * | 5/1931 | Brown ............................. 74/603 |
| 1,898,459 | A | * | 2/1933 | Newcomb ....................... 74/604 |
| 2,592,114 | A | * | 4/1952 | Bynum et al. ................... 74/604 |
| 4,412,515 | A | * | 11/1983 | Fritzenwenger ........... 123/192.2 |
| 5,293,684 | A | * | 3/1994 | Fry ................................. 74/603 |
| 5,469,820 | A | * | 11/1995 | Data et al. ................... 123/192.2 |

FOREIGN PATENT DOCUMENTS

| EP | 1065359 A2 | * | 1/2001 |
| JP | 60241544 A | * | 11/1985 |
| JP | 2005-105819 A | | 4/2005 |
| KR | 10-2004-0047391 A | | 6/2004 |

* cited by examiner

*Primary Examiner* — Noah Kamen
(74) *Attorney, Agent, or Firm* — Morgan, Lewis & Bockius LLP

(57) ABSTRACT

A balancing assembly of an engine may include a crankshaft in which crank pins each connected to a connecting rod, are disposed at both ends thereof, and that is equipped with a counterweight opposite to and corresponding to each crank pin, a balance shaft that is disposed at a distance from the crankshaft and that rotates by the crankshaft, and a balance weight that is eccentrically formed with a balance shaft and that absorbs vibration.

9 Claims, 6 Drawing Sheets

BALANCING ASSEMBLY OF AN ENGINE

CROSS-REFERENCE TO RELATED APPLICATION

The present application claims priority to Korean Patent Application No. 10-2008-0043606 filed May 9, 2008, the entire contents of which application is incorporated herein for all purposes by this reference.

BACKGROUND OF THE INVENTION

1. Field of the Invention

The present invention relates to a balancing assembly of an engine, and more particularly to a balancing assembly of an engine in which components are commonly used and a vibration characteristic is improved.

2. Description of Related Art

Lately, vehicles that are equipped with two- or three-cylinder engines have been launched for light weight, fuel reduction, and cheap price, etc.

The two-cylinder or three-cylinder engines have little difference in output or volume each other, but they have a large difference in a vibration characteristic because a rotation position of crank pins and timing of a power stroke are different from each other.

Particularly, the two- or three-cylinder engines have more vibration compared with a six-cylinder engine such that a counter plan is more necessary so as to absorb a vibration thereof. Further, investigations have been actively undertaken so as to enable the components of two- and three-cylinder engines to be interchangeable with each other.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a balancing assembly of an engine having advantages of reducing vibration and having its components be interchangeable between a two-cylinder engine and a three-cylinder engine.

In one aspect of the present invention, a balancing assembly of an engine may include a crankshaft in which two crank pins, each connected to a respective connecting rod, are disposed at both ends thereof, and that is coupled with a counterweight opposite to and corresponding to each crank pin, a balance shaft that is disposed at a distance from the crankshaft and that rotates by the crankshaft, and/or a balance weight that is eccentrically formed with the balance shaft and rotates in reverse direction of the crankshaft so as to absorb vibration.

The balancing assembly of an engine may further include a crank gear mounted on one end portion of the crankshaft, and/or a balance gear mounted on one end portion of the balance shaft and externally meshed with the crank gear, wherein the balance gear is rotated by the crank gear.

The balance weight may include a first balance weight disposed at the one end portion of the balance shaft and disposed adjacent to the balance gear, and/or a second balance weight disposed at the other end portion of the balance shaft.

A first key groove may be formed at the one end portion of the balance shaft, a second key groove to which a first key is engaged is formed in one portion of the first balance weight, and another second key groove is formed in another portion of the first balance weight at a first predetermined angle from the second key groove in a rotating direction, the first balance weight being engaged with the balance gear or the balance shaft by the first key. The first predetermined angle may be 180°.

A third key groove to which a second key may be engaged is formed in one portion of the balance gear, and another third key groove is formed in another portion of the balance gear at a second predetermined angle from the third key groove in a rotating direction, the balance gear being engaged with the first balance weight or the balance shaft by the second key. The second predetermined angle may be 210°.

The counterweight may be coupled to one portion of the crankshaft by a fastening member.

The crankshaft may further include an additional crank pin disposed substantially at the middle thereof and not connected to the crankshaft such that two cylinders coupled to the two crank pins are operated among three cylinders. The two crank pins may have equal rotation positions with respect to the crankshaft, and the additional crank pin has a 180° rotation difference with the two crank pins.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A two-cylinder engine is explained in the following according to various embodiments of the present invention, while referring to the accompanying drawings.

Figure 1:
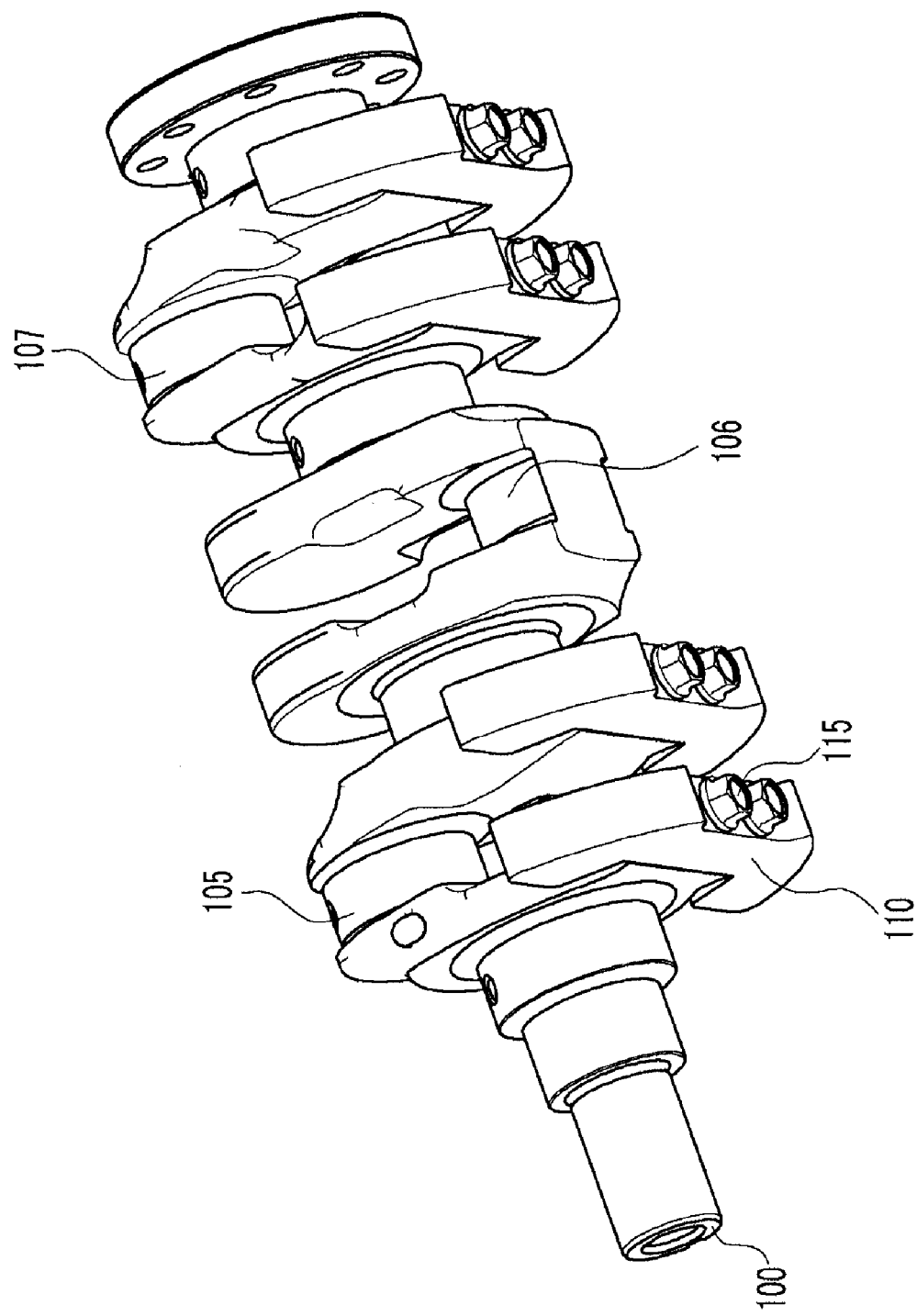
FIG. 1 is a perspective view of an exemplary crankshaft module that is mounted on a two-cylinder engine according to the present invention.
Figure 2:
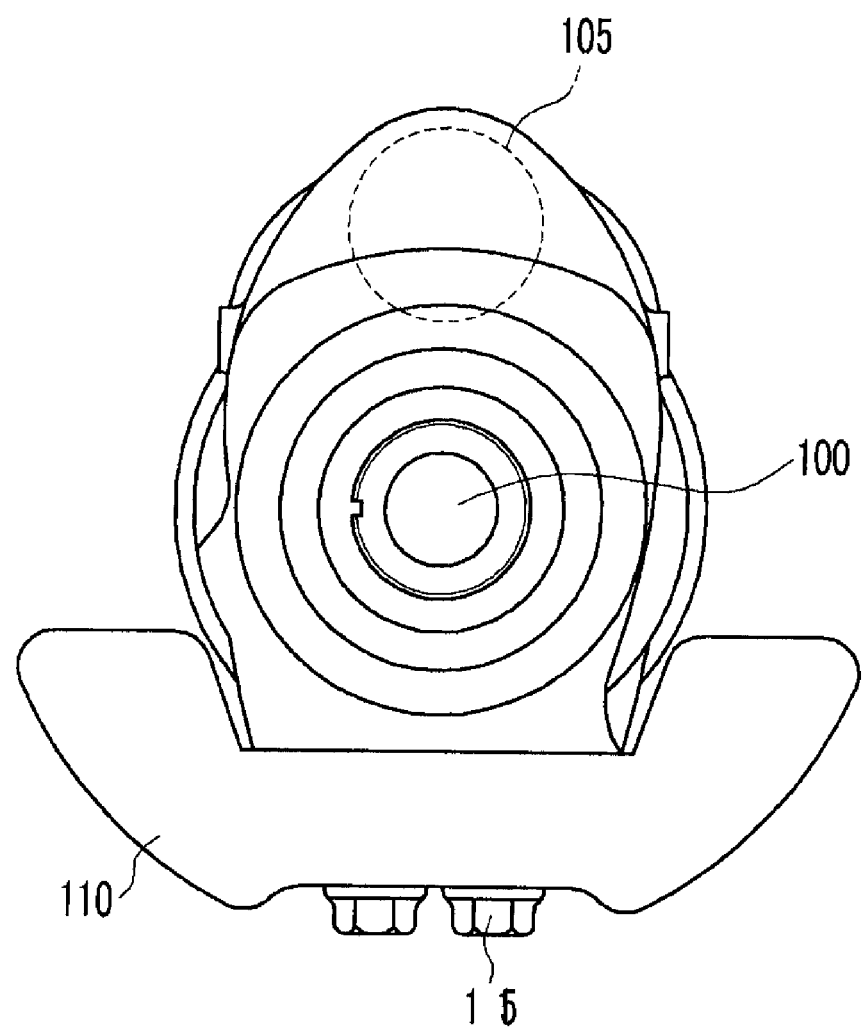
FIG. 2 is a side view of an exemplary crankshaft module according to the present invention.

FIG. 1 is a perspective view of a crankshaft module that is mounted on a two-cylinder engine according to various embodiments of the present invention, and FIG. 2 is a side view of a crankshaft module according to various embodiments of the present invention.

Referring to FIG. 1, a crankshaft module includes a crankshaft 100, crank pins 105, 106, and 107, a counterweight 110, and an engaging member 115.

Connecting rods are connected to the crank pins 105 and 107, and the crank pins 105 and 107 are rotated by the connecting rods based on the crankshaft 100. In the illustrated exemplary embodiment, the crank pins 105 and 107 that are connected to the connecting rods are disposed at both ends of the crankshaft 100 and have the same rotation positions with each other.

In the illustrated exemplary embodiment, the middle crank pin 106 that is disposed between the crank pins 105 and 107 is not connected to a connecting rod.

The counterweight 110 is disposed in an opposite side of the crank pin 105, and the counterweight 110 is assembled by the engaging member 115. As shown, two counterweights 110 are disposed corresponding to each crank pin 105 and 107.

The three cranks pins 105, 106, and 107 are prepared in the crankshaft 100, and among the three crank pins 105, 106, and 107, the first and third crank pins 105 and 107 are connected to pistons and the second crank pin 106 is not connected to a piston. Particularly, in various embodiments of the present invention, only two cylinders operate among the three cylinders.

The first and third crank pins 105 and 107 are disposed at respective end portions of the crankshaft 100, and the second crank pin 106 is disposed between the first and third crank pins 105 and 107.

Also, as shown in FIG. 1, the first and third crank pins 105 and 107 have the same rotation positions (rotation angle) in the crankshaft 100, and the second crank pin 106 has a rotation difference of 180° (rotation angle difference) with respect to the first and third crank pins 105 and 107.

The two crank pins 105 and 107 that are operated in the illustrated exemplary embodiment have same rotation positions, and one power stroke is performed per rotation of the crankshaft 100 such that uniform torque and secure driving output can be realized. However, because the two crank pins 105 and 107 have the same rotation position, the vibration characteristics are disadvantageous.

Accordingly, as described above, the counterweight 110 is engaged in the illustrated exemplary embodiment, and simultaneously a balance shaft module is prepared. The balance shaft module will be explained referring to FIG. 3A, FIG. 4, and FIG. 5.

Figure 3A:
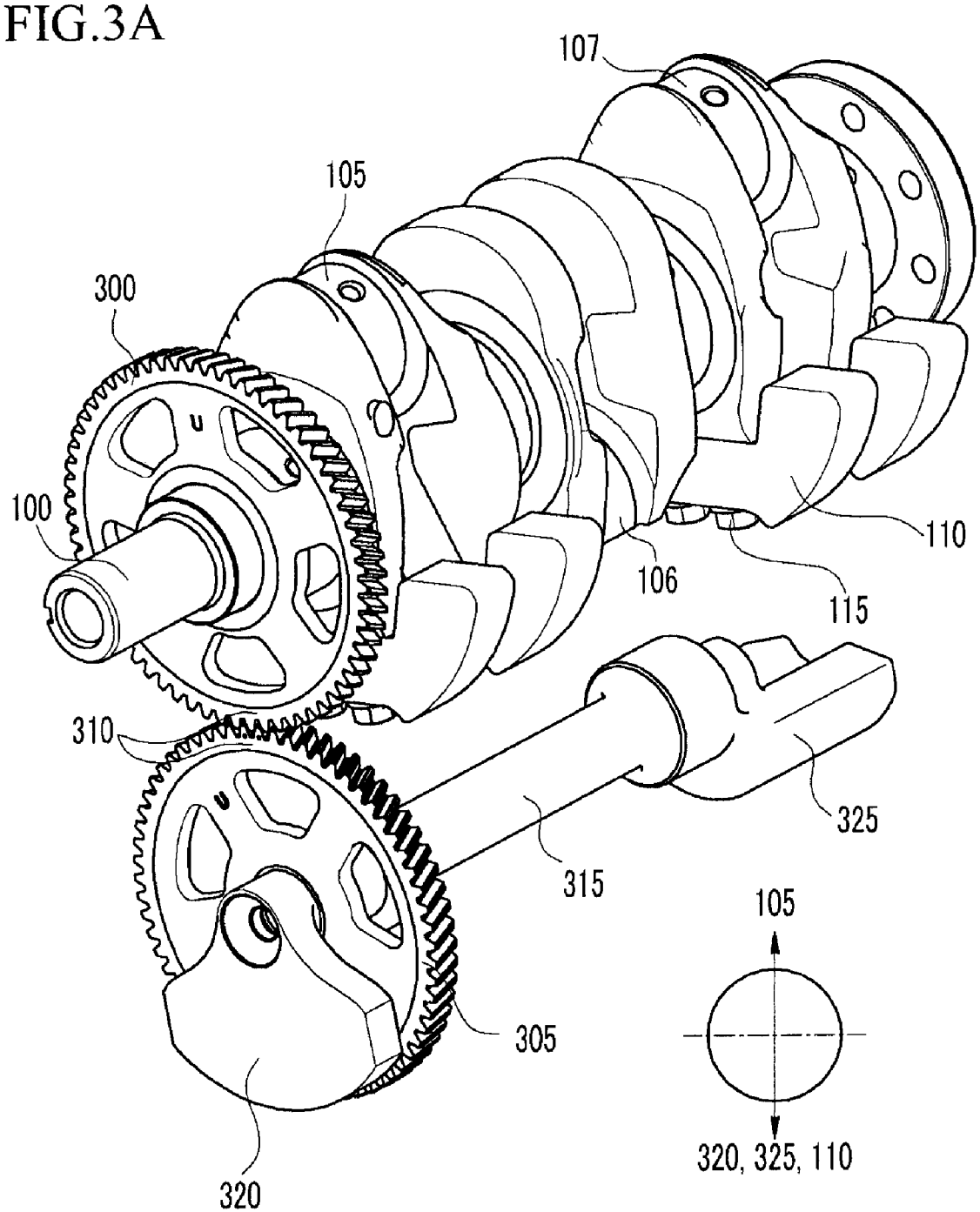
FIG. 3A is a perspective view showing a combined condition of an exemplary crankshaft module and an exemplary balance shaft module according to the present invention.
Figure 3B:
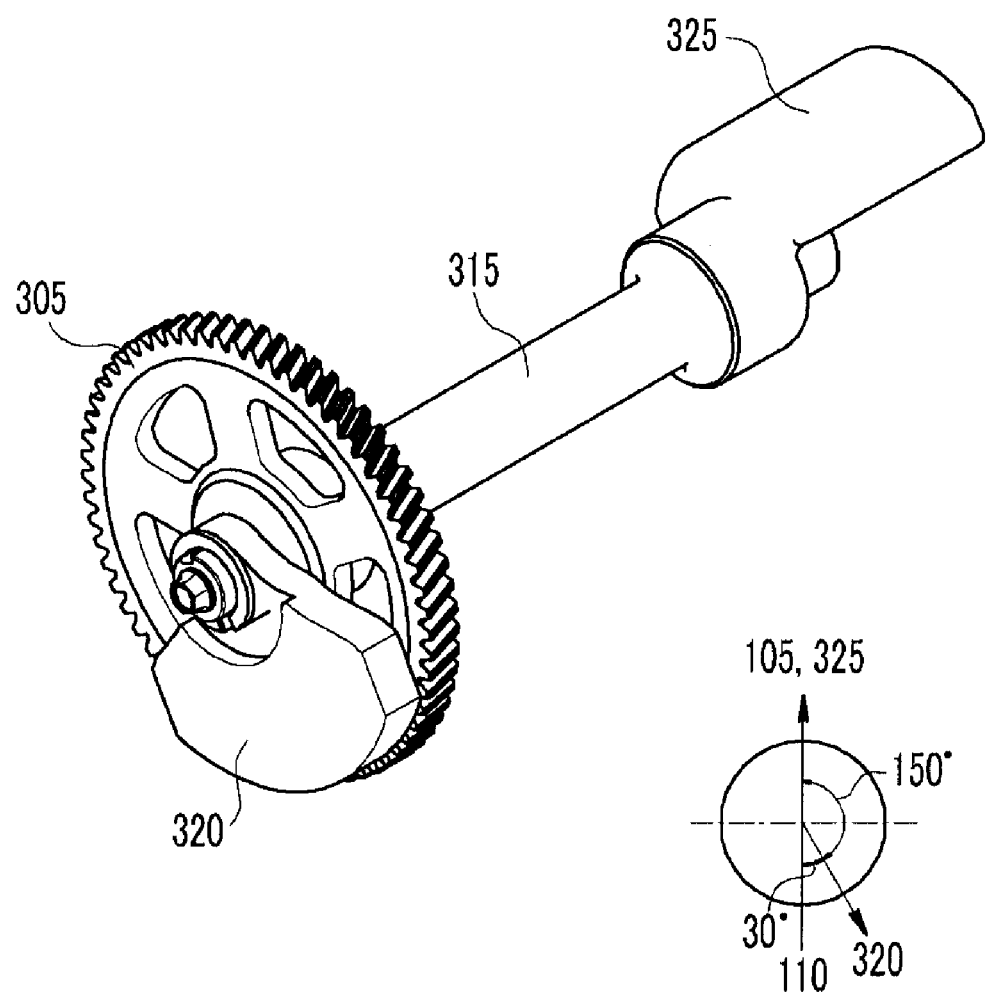
FIG. 3B is a perspective view of an exemplary balance shaft module that is mounted on a three-cylinder engine.

FIG. 3A is a perspective view showing a combined condition of a crankshaft module and a balance shaft module that is mounted on a two-cylinder engine according to various embodiments of the present invention, and FIG. 3B is a perspective view of a balance shaft module that is mounted on a three-cylinder engine.

Referring to FIG. 3A, as shown, the two-cylinder engine includes a crankshaft 100, crank pins 105, 106, and 107, a counterweight 110, an engaging member 115, a crank gear 300, a balance gear 305, a balance shaft 315, a first balance weight 320, and a second balance weight 325.

The crank gear 300 is connected to one end portion of the crankshaft 100. Further, the balance shaft 315 is disposed in parallel with the crankshaft 100, and the balance gear 305 is connected to one end portion of the balance shaft 315.

The balance gear 305 and the crank gear 300 are externally meshed with each other. Particularly, the crank gear 300 and the balance gear 305 have the same rotation speed in various embodiments. Also, a timing mark 310 is formed at one side of the crank gear 300 and the balance gear 305.

A first balance weight 320 is disposed at one end portion of the balance shaft 315, and a second balance weight 325 is disposed at the other end portion thereof.

The mass centers of the first and second balance weights 320 and 325 depart from the rotation center of the balance shaft 315, and these absorb vibration and noise that are generated in the engine or the crankshaft module.

There are rotation masses and reciprocating masses in the engine, and the counterweight 110 mainly absorbs vibration of the rotation mass, and the first and second balance weights 320 and 325 mainly absorbs vibration of the reciprocating mass.

The rotation ratio of the balance gear 305 to the crank gear 300 can be predetermined to be 1 in various embodiments, but according to the vibration characteristic generated in the engine, the rotation ratio thereof can be set to 2 or 4.

Again referring to FIG. 3A, the first and second balance weights 320 and 325 have the same rotation position and are disposed at the balance shaft 315 in a lower position, the same as that of the counterweight 110 that is mounted on the crankshaft 100 in a lower position thereof.

Also, because the crank gear 300 and the balance gear 305 have the same rotation ratio, the counterweight 110 and the first and second balance weights 320 and 325 have the same rotation positions.

A balance shaft module (FIG. 3B) that is prepared in a three-cylinder engine and the balance shaft module (FIG. 3A) that is prepared in the two-cylinder engine have different characteristics in various embodiments of the present invention.

Referring to FIG. 3B that relates to the three-cylinder engine, the second balance weight 325 that is mounted on the balance shaft 315 is disposed at an uppermost portion, and the first balance weight 320 is disposed at a position such that it is rotated by 30° in an anti-clockwise direction at the lowermost portion. Accordingly, the first and second balance weight 320 and 325 have a rotation difference of 150° in a clockwise direction with each other.

When FIG. 3A that relates to the two-cylinder engine and FIG. 3B that relates to the three-cylinder engine are compared with each other, there is a difference in the rotation position of the first and second balance weights 320 and 325.

Figure 4:
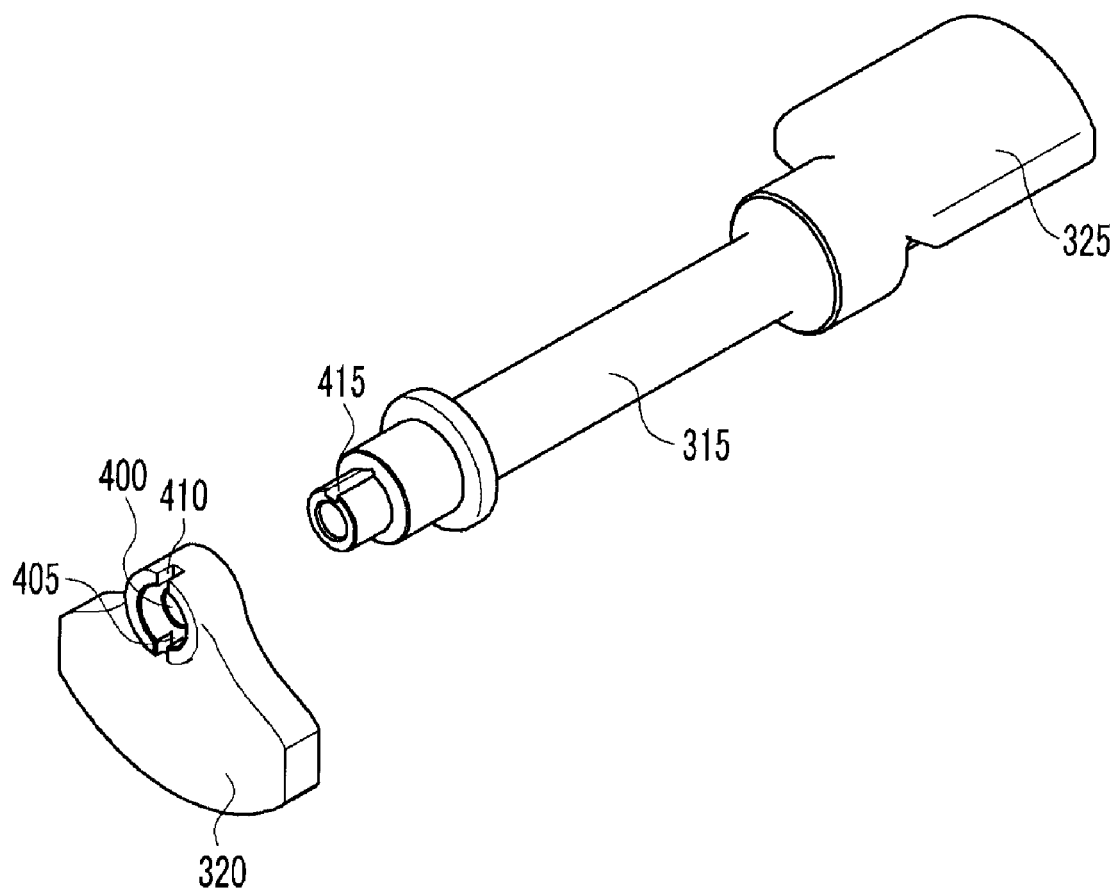
FIG. 4 is an exploded perspective view of an exemplary balance shaft module according to the present invention.
Figure 5:
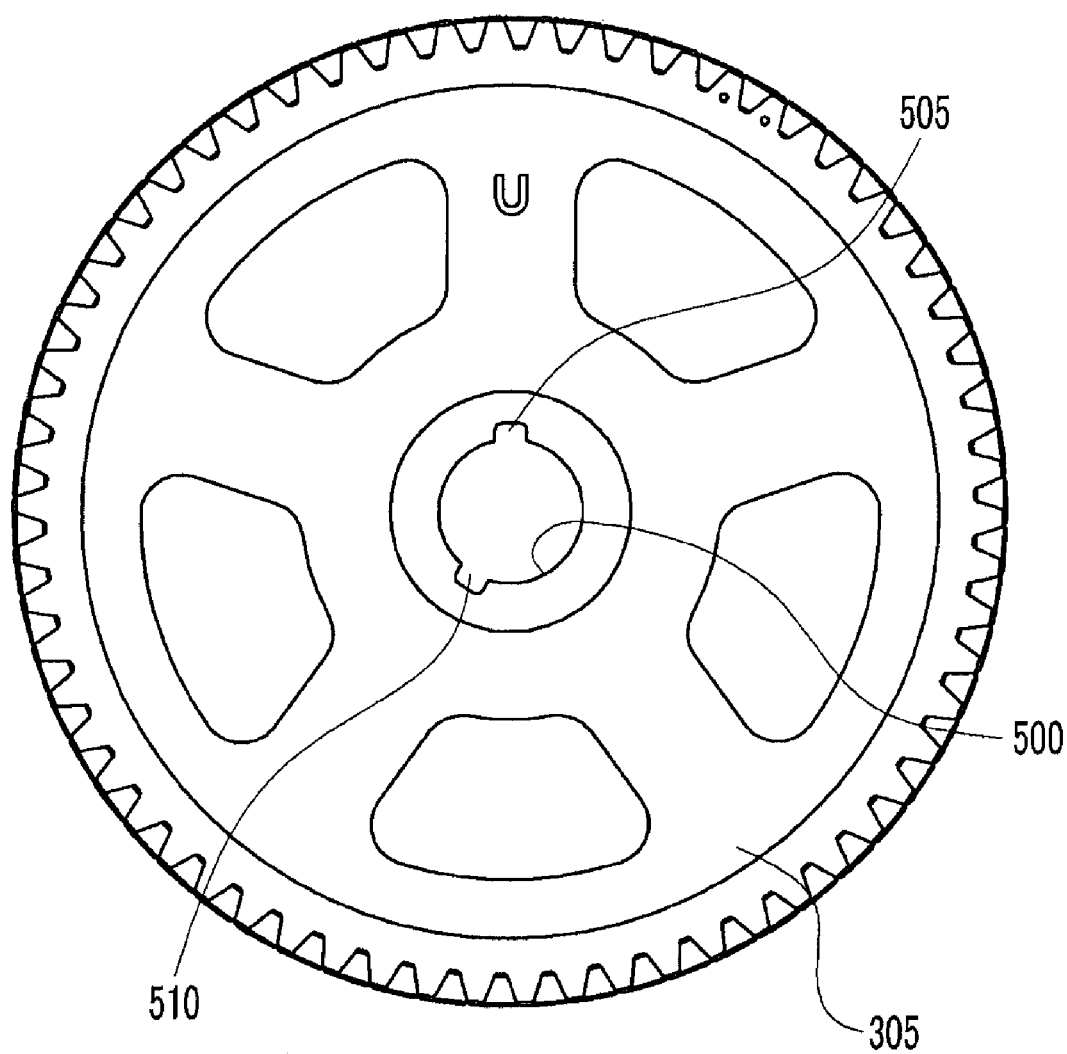
FIG. 5 is a side view of a balance gear according to the present invention.

FIG. 4 is an exploded perspective view of a balance shaft module according to various embodiments of the present invention, and FIG. 5 is a side view of a balance gear according to various embodiments of the present invention.

Referring to FIG. 4, one end portion of the balance shaft 315 has a pipe shape, and a first key groove 415 is formed in the one end portion at an exterior circumference along a longitudinal direction of the balance shaft 315.

Also, in various embodiments of the present invention, the first key groove 415 may be positioned in an upper portion of the balance shaft 315 on which the second balance weight 325 is disposed.

A hole 400 through which the end portion of the balance shaft 315 is inserted is formed in the first balance weight 320, and a pair of second key grooves 410 and 405 are formed adjacent to the hole 400 in various embodiments of the present invention. The second key grooves 410 and 405 are formed in one end portion of the first balance weight 320 and are formed along longitudinal direction of the hole 400 at outer circumference thereof.

As shown, the second key grooves 410 and 405 are positioned in opposite directions from each other and they have a rotation difference of 180°. Accordingly, the rotation position of the first balance weight 320 that is engaged with the balance shaft 315 or the balance gear 305 by a key can be changed.

Referring to FIG. 5, a hole 500 through which the balance shaft 315 is inserted is formed in the middle of the balance gear 305, and a pair of third key grooves 505 and 510 are formed in an interior circumference of the hole 500 in various embodiments of the present invention.

As shown, the third key grooves 505 and 510 have a rotation difference of 210° in a clockwise direction from each other. Accordingly, the rotation position of the balance gear 305 that is engaged with the balance shaft 315 and the first balance weight 320 by a key can be changed.

Particularly, when the balance shaft module is applied to the two-cylinder engine and the three-cylinder engine in various embodiments of the present invention, the rotation positions of the balance gear 305, the first balance weight 320, and the balance shaft 315 are changed so that the components are commonly used. That is, the balance shaft module is commonly used in the two-cylinder engine and the three-cylinder engine such that productivity can be improved and development costs can be reduced.

Also, the balance shaft module is disposed in the two-cylinder engine such that the vibration and noise thereof can be effectively absorbed.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A balancing assembly of an engine, comprising:
   a crankshaft in which two crank pins, each connected to a respective connecting rod, are disposed at both ends thereof, and that is coupled with a counterweight opposite to and corresponding to each crank pin;
   a balance shaft that is disposed at a distance from the crankshaft and that rotates by the crankshaft; and
   a balance weight that is eccentrically formed with the balance shaft and rotates in reverse direction of the crankshaft so as to absorb vibration;
   wherein the crankshaft further comprises an additional crank pin disposed substantially at the middle thereof and not connected to a connecting rod such that two cylinders coupled to the two crank pins are operated among three cylinders.

2. The balancing assembly of an engine of claim 1, wherein the two crank pins have equal rotation positions with respect to the crankshaft, and the additional crank pin has a 180° rotation difference with the two crank pins.

3. A balancing assembly of an engine, comprising:
   a crankshaft in which two crank pins, each connected to a respective connecting rod, are disposed at both ends thereof, and that is coupled with a counterweight opposite to and corresponding to each crank pin;
   a balance shaft that is disposed at a distance from the crankshaft and that rotates by the crankshaft; and
   a balance weight that is eccentrically formed with the balance shaft and rotates in reverse direction of the crankshaft so as to absorb vibration,
   a crank gear mounted on one end portion of the crankshaft; and
   a balance gear mounted on one end portion of the balance shaft and externally meshed with the crank gear, wherein the balance gear is rotated by the crank gear,
   wherein the balance weight comprises:
      a first balance weight disposed at the one end portion of the balance shaft and disposed adjacent to the balance gear; and
      a second balance weight disposed at the other end portion of the balance shaft; and
   wherein a first key groove is formed at the one end portion of the balance shaft, a second key groove to which a first key is engaged is formed in one portion of the first balance weight, and another second key groove is formed in another portion of the first balance weight at a first predetermined angle from the second key groove in a rotating direction, the first balance weight being engaged with the balance gear or the balance shaft by the first key.

4. The balancing assembly of an engine of claim 3, wherein the first predetermined angle is 180°.

5. The balancing assembly of an engine of claim 3, wherein a third key groove to which a second key is engaged is formed in one portion of the balance gear, and another third key groove is formed in another portion of the balance gear at a second predetermined angle from the third key groove in a rotating direction, the balance gear being engaged with the first balance weight or the balance shaft by the second key.

6. The balancing assembly of an engine of claim 5, wherein the second predetermined angle is 210°.

7. The balancing assembly of an engine of claim 3, wherein the counterweight is coupled to one portion of the crankshaft by a fastening member.

8. A two-cylinder engine comprising the balancing assembly as defined in claim 3.

9. A passenger vehicle comprising the two-cylinder engine of claim 8.

* * * * *